Jan. 1, 1924

W. H. HARWOOD

CLINCHER RIM

Filed Aug. 25, 1920

1,479,095

Inventor

W. H. Harwood,

By

Attorneys

Patented Jan. 1, 1924.

1,479,095

UNITED STATES PATENT OFFICE.

WILLIAM H. HARWOOD, OF CHEYENNE, WYOMING.

CLINCHER RIM.

Application filed August 25, 1920. Serial No. 405,951.

*To all whom it may concern:*

Be it known that I, WILLIAM H. HARWOOD, a citizen of the United States, residing at Cheyenne, in the county of Laramie and State of Wyoming, have invented new and useful Improvements in Clincher Rims, of which the following is a specification.

This invention relates to rims of the clincher type for retaining pneumatic and solid tires upon the felly of a wheel.

According to the present invention the rim includes two longitudinal sections, each in the form of a ring, the two ring members having an interfitting screw threaded connection, whereby the ring members may not only be connected but may be clamped snugly upon the bead portions of the tire. Provision is made for securely locking the engaged rim members so as to prevent accidental unscrewing thereof, such means also serving to assist in the unscrewing of the rim members.

With these and other objects in view, the present invention consists in the combination and arrangement of parts as will be hereinafter more fully described, illustrated in the accompanying drawings and particularly pointed out in the appended claim, it of course being understood that changes in the form, proportion, size and minor details may be made, within the scope of the claim, without departing from the spirit or sacrificing any of the advantages of the invention.

Figure 1:
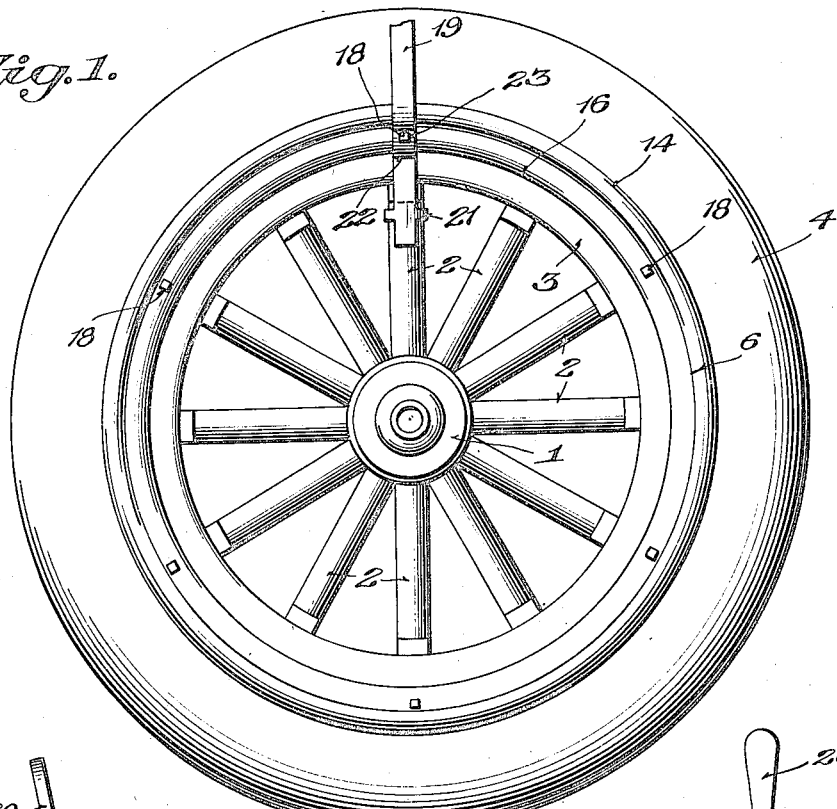
Figure 1 is a side elevation of a conventional form of automobile wheel and tire including the rim of the present invention.

In the accompanying drawings there has been shown an ordinary wooden automobile wheel including a hub 1, spokes 2 and a felly 3. The tire 4 is an ordinary pneumatic tire provided with the usual beads 5.

In carrying out my invention I provide two rim members 6 and 7, each in the form of a ring having an inwardly directed hook shaped flange as in the usual clincher type of rim. The rim member 7 includes a circular band 8, the interior surface of which is flat transversely and of a width corresponding to the width of the felly 3, the internal diameter of the band being such as to afford a snug fitting of the band upon the felly. The band 8 is externally screw threaded at 9 with the screw threads leading inwardly from the adjacent circumferential edge of the band. At the opposite edge of the band there is an external hook shaped circumferential flange 10 which extends inwardly a suitable distance across the outer face of the band. From about the middle and upon the outer face thereof, said band is provided with a transversely inclined portion 11 which inclines from the flange in a general direction towards the axis of the band so as to form a wedge surface as will hereinafter appear. At the base of the flange 7 there is an annular rib or shoulder 12, the inner face of which is substantially at right angles to the interior of the band 8.

Figure 2:
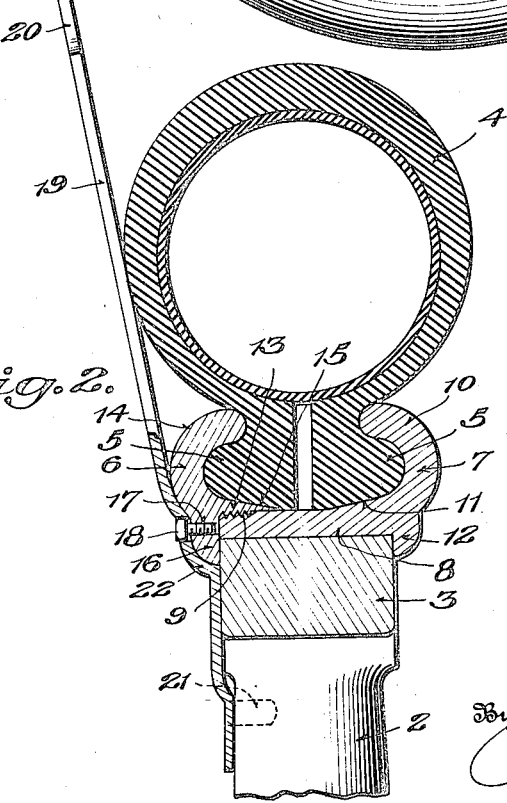
Figure 2 is an enlarged cross sectional view taken through the tire, the rim and the felly of the wheel.
Figure 3:
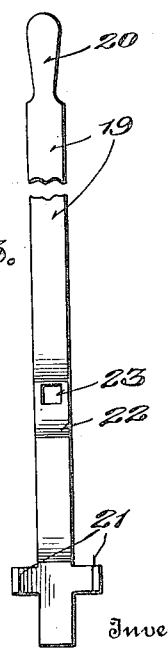
Figure 3 is an inner face view of the tool employed for rotating one of the rim members when assembling and disassembling the rim members.

The other rim member includes a band portion 13 which is substantially triangular or wedge shaped in cross section, has an internal diameter to fit upon the threaded part of the band 8 and is internally threaded to fit the threaded part 9 of said band 8. The rim member 6 is provided with a hook shaped flange 14 which is a substantial duplicate of the hook shaped flange 10, and the upper surface 15 of the band member 13 is inclined reversely to the inclined face 11 of the band 8. An annular rib or shoulder 16 is provided upon the inner periphery of the band member 13, and this rib or shoulder is provided at suitable intervals with screw threaded openings, one of which is shown at 17 in Figure 2. For each of the screw threaded openings 17 there is a set screw 18 which is provided upon its outer end with a suitable head.

In using the present device, the rim member 8 is placed sidewise upon the felly 3 from the inner side thereof with the annular shoulder 12 engaged with the adjacent side of the felly. The tire 4 is then placed upon the rim member 8 with one of its beads 5 engaged with the hook shaped flange 10. The rim member 6 is then applied sidewise so as to insert the part 13 between the unflanged edge of the rim member 8 and the adjacent bead 5 of the tire, the screw threaded portions of the two rim members being engaged and the member 6 turned until it has been snugly fitted in place, whereby the inclined or wedge faces 11 and 15 of the rim members will wedge the beads 5 snugly within the hook shaped flanges 10 and 14. The several set screws 8 are then engaged with the screw threaded openings in the rim member 6 and are turned to bring their inner ends into snug engagement with the adjacent outer edge of the rim member 8 whereby the two rim members will be effectually interlocked against accidental unscrewing. The set screws 18 may be fitted to the rim member 6 prior or subsequent to the application of the rim member 6 to the rim member 8. The screwing of the rim member 6 upon the rim member 8 not only snugly clamps the hook shaped flanges 10 and 14 upon the beads of the tire but also draws the shoulders 12 and 16 into snug engagement with the opposite radial walls of the felly 3 so as to hold the rim snugly in place upon the felly.

The rim members may be conveniently separated for removing the tire, by merely backing off the several set screws 18 so as to release the grip thereof against the rim member 8, whereupon the rim member 6 may be unscrewed and entirely removed from the rim member 8, the latter being permitted to remain upon the felly or removed therefrom as may be desired.

Normally the heads of the set screws project externally of the annular shoulder 16 so as to be conveniently accessible when tightening and loosening the set screws.

For convenience in tightening and releasing the rim member 6, I provide a tool which consists of a bar 19 provided at one end with a suitable handle 20, and also provided adjacent its opposite end with a pair of transversely extending fingers 21. At an intermediate portion of the bar or lever 19 there is an offset part 22 which is provided with a seat, socket or recess 23 preferably in the form of an opening of a size and configuration to receive the head of any one of the fastenings 18.

The tool is employed by first receiving one of the spokes of the wheel between the fingers 21 and then engaging the seat or recess 23 with the head of one of the fastenings 18, whereupon the tool is employed as a lever working upon one of the fingers 21 as a fulcrum, whereby the rim member 6 may be set up snugly against the adjacent bead of the tire or backed off therefrom. It will now be understood that the set screws 18 not only interlock the two rim members but also serve as shoulders, abutments or the like for use in applying force or pressure to the rim member 6 when turning the latter to tighten or release the same.

From the foregoing description, it will be understood that the present clincher rim is made up of two rim members and a plurality of set screws, thus presenting a very simple and inexpensive rim capable of being conveniently applied and removed and also serving to retain the tire in place upon the felly in a very simple and efficient manner.

When in use, the annular ribs or shoulders 12 and 16 prevent lateral displacement of the rim and firmly brace the rim members against transverse stresses. The rim member 8 is only as wide as the felly, and the interengagement between the rim members is within the transverse limits of the felly, which produces a very snug and compact arrangement, and the interconnected parts of the rim members are backed up by the felly.

What I claim is:

A clincher rim including two separable rim members, one rim member being in the form of a band having its inner periphery straight transversely thereof, one edge of said rim member being provided with an external annular hook-shaped flange overhanging the rim member, said edge of the rim also being provided with an internal annular shoulder, the outer periphery of the rim member being externally screw-threaded at the opposite edge of the member and inclined transversely adjacent the hook shaped flange, the other rim member being in the form of a band which is wedge shaped in cross section and internally screw-threaded to fit the externally screw-threaded portion of the first mentioned band, the second mentioned band being provided at its outer edge with an external annular hook-shaped flange overhanging the band, the said band also being provided at its outer edge with an internal annular shoulder extending transversely across the adjacent edge of the first mentioned band and also projecting beyond the inner periphery thereof, and a set screw extending through the shoulder of the second mentioned band for engagement with the adjacent edge of the first mentioned band, the head of the set screw projecting externally of the rim member and constituting a shoulder or abutment for use in assembling and disassembling the rim members.

his
WILLIAM H. × HARWOOD.
mark

Witnesses:
M. C. McInerney,
Sam F. McGrew.